United States Patent
Sun et al.

(10) Patent No.: US 9,930,154 B2
(45) Date of Patent: Mar. 27, 2018

(54) SPEAKER MODULE

(71) Applicant: Goertek Inc., Weifang (CN)

(72) Inventors: Ye Sun, Weifang (CN); Hongchao Sun, Weifang (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 15/302,828

(22) PCT Filed: Mar. 10, 2015

(86) PCT No.: PCT/CN2015/073941
§ 371 (c)(1),
(2) Date: Oct. 7, 2016

(87) PCT Pub. No.: WO2015/172601
PCT Pub. Date: Nov. 19, 2015

(65) Prior Publication Data
US 2017/0034323 A1 Feb. 2, 2017

(30) Foreign Application Priority Data
May 13, 2014 (CN) .................... 2014 2 0242962 U

(51) Int. Cl.
*H04M 1/00* (2006.01)
*H04M 1/03* (2006.01)
(Continued)

(52) U.S. Cl.
CPC ................ *H04M 1/03* (2013.01); *H04R 9/02* (2013.01); *H04R 9/06* (2013.01);
(Continued)

(58) Field of Classification Search
CPC . H04R 9/02; H04R 9/06; H04R 1/345; H04R 25/604; H04R 31/006; H04R 9/047; H04R 1/2842; H04M 1/03
See application file for complete search history.

(56) References Cited

U.S. PATENT DOCUMENTS

2010/0110283 A1* 5/2010 Shin ................. H04N 5/2251
348/374
2013/0311453 A1* 11/2013 Petri ............... G06F 17/30489
707/722

FOREIGN PATENT DOCUMENTS

CN         1390383 A         1/2003
CN         1604604 A         4/2005
(Continued)

OTHER PUBLICATIONS

Written Opinion of the International Searching Authority from corresponding PCT Application No. PCT/CN2015/073941, dated May 28, 2015 (5 pages).

*Primary Examiner* — Tuan Pham
(74) *Attorney, Agent, or Firm* — Harness, Dickey & Pierce, P.L.C.

(57) ABSTRACT

The present disclosure relates to the technical field of electro-acoustic products. Disclosed is a speaker module installed in an electronic terminal, comprising: a housing receiving therein a speaker unit which is electrically connected with an external circuit of the module via an FPCB; and a sensor configured to detect ambient noise, the sensor being electrically connected with the FPCB, the sensor being installed at a position adjacent to a sound exit hole of the electronic terminal, and the sensor being used to transmit a detected ambient noise signal to a CPU of the electronic terminal via the FPCB. The electronic terminal installed with the speaker module may automatically tune the sound volume of the speaker module according to the amount of noise in the external environment, thereby ensuring a user to timely hear a prompt tone generated by the electronic terminal in any environment, and effectively avoiding missing an important event or call due to failure to hear the prompt tone.

4 Claims, 2 Drawing Sheets

(51) Int. Cl.
    *H04R 9/02*     (2006.01)
    *H04R 9/06*     (2006.01)
    *H04R 1/02*     (2006.01)

(52) U.S. Cl.
    CPC ......... *H04M 2250/12* (2013.01); *H04R 1/026* (2013.01); *H04R 2430/01* (2013.01)

(56) References Cited

FOREIGN PATENT DOCUMENTS

| CN | 202395837 U | 8/2012 |
| CN | 203086734 U | 7/2013 |
| CN | 203193823 U | 9/2013 |
| CN | 203840537 U | 9/2014 |

\* cited by examiner

SPEAKER MODULE

FIELD OF THE DISCLOSURE

The present disclosure relates to the technical field of electro-acoustic products, and particularly to a speaker module.

BACKGROUND ART

The speaker module is an important acoustic component in an electronic terminal, and may convert electrical energy into acoustic energy and irradiate it out. A current speaker module comprises a housing, and a cavity formed by the housing receives a micro-speaker unit and an FPCB (Flexible Printed Circuit Board) for electrically connecting the speaker unit with a module external circuit (namely, a circuit in the electronic terminal).

A sound volume (namely, a volume of sound generated by the speaker module) of a current electronic terminal is controlled by a volume tuning key on the electronic terminal. If the sound volume of the electronic terminal is set small and the external environment is relatively noisy, it is very difficult for people to hear various prompt tones of the electronic terminal so that some important events might be missed. Take a most-frequently mobile phone as an example: as we all know, the mobile phone provides an incoming call prompt tone, short message prompt tone and some personally-set prompt tones of important event, and the like. The currently prevailing 3G ($3^{rd}$-Generation mobile communication technology) or 4G (the $4^{th}$ Generation mobile communication technology) mobile phone further has QQ (Tencent instant communication) information prompt tone, WeChat information prompt tone and some mail prompt tones. If the sound volume of the mobile phone is tuned very small in a noisy environment, the mobile phone owner cannot hear the mobile phone prompt tones and thereby misses some important phone calls or some other events.

SUMMARY OF THE DISCLOSURE

A technical problem to be solved by the present disclosure is to provide a speaker module which can sense ambient environment so that an electronic terminal may tune sound volume according to the ambient environment, thereby ensuring a user to timely hear a prompt tone generated by the electronic terminal in any environment.

To solve the above technical problem, the present disclosure employs the following technical solutions:

A speaker module installed in an electronic terminal, comprising: a housing receiving therein a speaker unit which is electrically connected with an external circuit of the module via an FPCB; and a sensor configured to detect ambient noise, the sensor being electrically connected with the FPCB, the sensor being installed at a position adjacent to a sound exit hole of the electronic terminal, and the sensor being used to transmit a detected ambient noise signal to a CPU of the electronic terminal via the FPCB.

The present disclosure achieves the following advantageous effects after employing the above technical solutions:

The speaker module according to the present disclosure further comprises the sensor for detecting the ambient noise, the sensor is electrically connected with the FPCB, and the sensor is installed adjacent to the sound exit hole of the electronic terminal. The sensor may detect whether the environment where the electronic terminal lies is noisy through the sound exit hole of the electronic terminal, i.e., the sensor may detect the volume of the ambient noise and transmits the detected signal to a CPU (Central Processing Unit) of the electronic terminal via the FPCB. The CPU, according to the received sensor signal, automatically adjusts the volume of the sound generated by the speaker module, namely, tunes the sound volume of the electronic terminal. When the senor detects that the ambient environment is very noisy, the CPU will automatically tune the volume larger according to the signal transmitted from the sensor, thereby ensuring the mobile phone owner to hear various prompt tones generated by the electronic terminal in a noisy environment, and avoiding missing an important call or event due to failure to hear the prompt tones.

The above depictions are only generalization of technical solutions of the present disclosure. To make technical means of the present disclosure more apparent, so the present disclosure may be implemented according to the content of the description, furthermore, to make the above and other objects, features and advantages of the present disclosure more apparent, specific embodiments of the present disclosure will be illustrated as follows.

BRIEF DESCRIPTION OF DRAWINGS

Various other advantages and merits will become apparent to those having ordinary skill in the art by reading through the following detailed description of preferred embodiments. Figures are only intended to illustrate preferred embodiments and not construed as limiting the present disclosure. In the figures.

In the figures, the reference number 10 denotes a first housing, 12 a lug, 20 a second housing, 22 an installation hole, 24 a notch, 30 a speaker unit, 40 an FPCB, and 50 a sensor.

DETAILED DESCRIPTION OF PREFERRED EMBODIMENTS

In the depictions hereunder, some exemplary embodiments of the present disclosure are described only in an illustrative manner. Undoubtedly, those having ordinary skill in the art may appreciate that embodiments may be modified in various different manners without departing from the spirit and scope of the present disclosure. Hence, the figures and depictions are illustrative in essence and not intended to limit the protection scope of claims. In the description, identical reference numbers denote identical or like parts.

The present disclosure will be further illustrated with reference to figures and embodiments.

Embodiment 1

Figure 1:
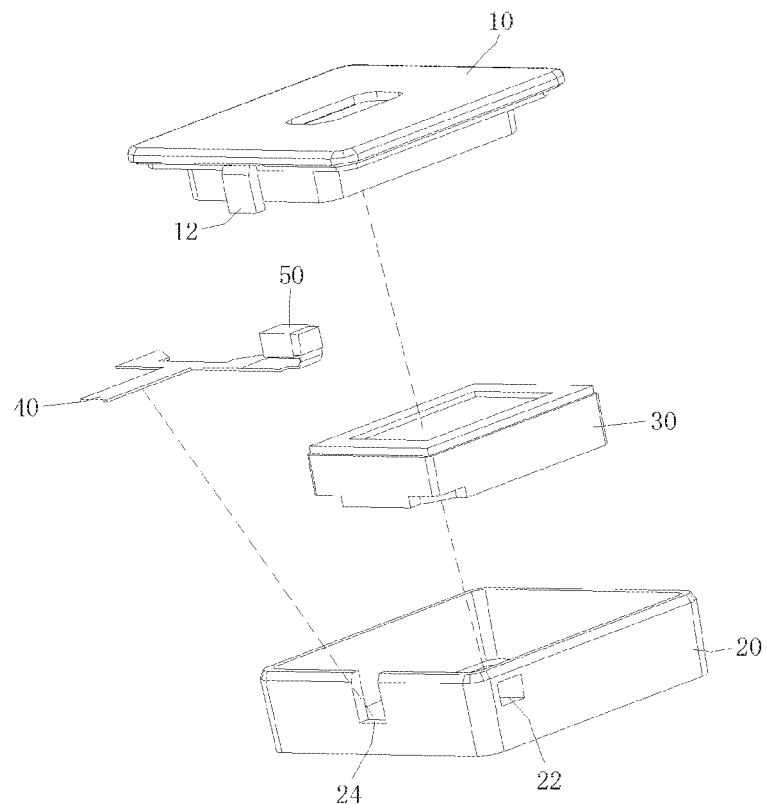
FIG. 1 is an exploded structural schematic view of a speaker module according to the present disclosure.

As shown in FIG. 1, a speaker module installed in an electronic terminal (not shown in the figure) comprises a first housing 10 and a second housing 20 which are engaged together, a space surrounded by the first housing 10 and second housing 20 receives a speaker unit 30 as well as a FPCB 40 for electrically connecting the speaker unit 30 with a module external circuit, one end of the FPCB 40 is located in the module inner cavity and electrically connected with the speaker unit 30, and the other end of the FPCB 40 is located external of the module inner cavity and electrically connected with the module external circuit.

Figure 2:
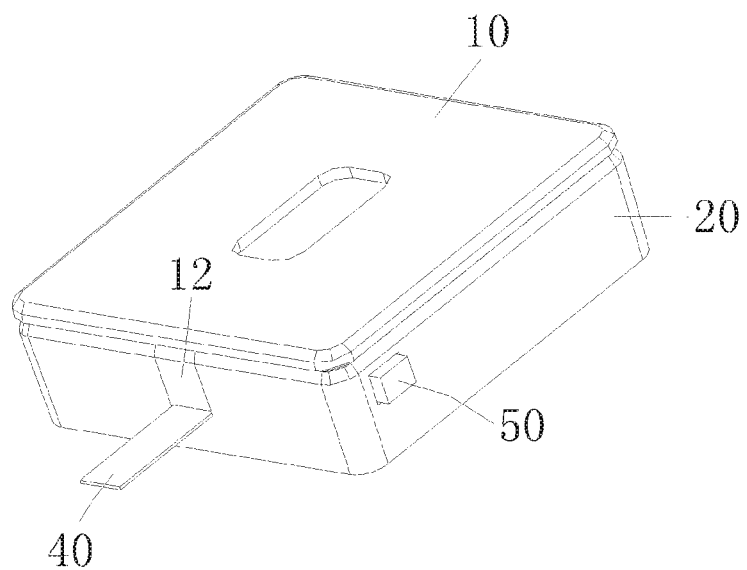
FIG. 2 is an assembled view of FIG. 1.

As jointly shown in FIG. 1 and FIG. 2, the module further comprises a sensor 50 installed on the FPCB 40 and electrically connected with the FPCB 40, the sensor 50 is installed at a location where the FPCB 40 is located in the module inner cavity, and the sensor is used to detect ambient noise. An installation hole 22 is provided at a location on the second housing 20 corresponding to the sensor 50, a probe of the sensor 50 extends through the installation hole 22 out of the module inner cavity, and a glue is applied between the sensor 50 and the second housing 20 for sealing. The installation position of the sensor 50 should be adjacent to a sound exit hole of the electronic terminal. In the present embodiment, the probe of the sensor 50 preferably faces towards the sound exit hole of the electronic terminal, which assists the sensor 50 in detecting the ambient noise. The sensor transmits a detected ambient noise signal to a CPU of the electronic terminal via the FPCB 40, the CPU automatically tunes the volume of the sound generated by the speaker module according to the received sensor signal. When the sensor 50 detects that the ambient environment is very noisy, the CPU will tunes the sound volume greater according to the signal transmitted from the sensor 50, thereby ensuring the mobile phone owner to hear a prompt tone generated by the electronic terminal in a noisy environment, and avoiding missing an important call or event due to failure to hear the prompt tone.

As jointly shown in FIG. 1 and FIG. 2, a notch 24 is provided at a position on a sidewall of the second housing 20 corresponding to the position where the FPCB 40 extends out, a lug 12 mating with the notch 24 is provided at a position on the first housing 10 corresponding to the notch 24, a gap allowing the FPCB 40 to pass therethrough is provided between an end of the lug 12 and a bottom of the notch 24, and an end of the FPCB 40 extends through the gap out of the module inner cavity and is electrically connected with the module external circuit. A glue is applied between the FPCB 40 and the first housing 10 and second housing 20 for sealing.

Embodiment 2

The present embodiment is substantially identical with Embodiment 1 and different from Embodiment 1 in that:

the sensor is installed outside the first housing and in this embodiment the installation hole allowing the senor to pass therethrough needn't to be provided on the second housing.

As compared with Embodiment 1, Embodiment 2 exhibits a simpler housing structure and a simpler and more feasible assembling process, but requires occupation of a larger external space of the module.

Embodiment 3

The present embodiment is substantially identical with Embodiment 1 and different from Embodiment 1 in that the sensor is installed outside the second housing and the installation hole allowing the senor to pass therethrough needn't to be provided on the second housing.

As compared with Embodiment 1, Embodiment 2 exhibits a simpler housing structure and a simpler and more feasible assembling process, but requires occupation of a larger external space of the module.

Embodiment 4

The present embodiment is substantially identical with Embodiment 1 and different from Embodiment 1 in that the housing includes the first housing, second housing and a third housing which are engaged together.

Embodiment 5

The present embodiment is substantially identical with Embodiment 4 and different from Embodiment 4 in that the sensor is installed outside the first housing and the installation hole allowing the senor to pass therethrough needn't to be provided on the second housing.

As compared with Embodiment 4, Embodiment 5 exhibits a simpler housing structure and a simpler and more feasible assembling process, but requires occupation of a larger external space of the module.

Embodiment 6

The present embodiment is substantially identical with Embodiment 4 and different from Embodiment 4 in that the sensor is installed outside the second housing and the installation hole allowing the senor to pass therethrough needn't to be provided on the second housing.

As compared with Embodiment 4, Embodiment 6 exhibits a simpler housing structure and a simpler and more feasible assembling process, but requires occupation of a larger external space of the module.

Embodiment 7

The present embodiment is substantially identical with Embodiment 4 and different from Embodiment 4 in that the sensor is installed outside the third housing and the installation hole allowing the senor to pass therethrough needn't to be provided on the second housing.

As compared with Embodiment 4, Embodiment 7 exhibits a simpler housing structure and a simpler and more feasible assembling process, but requires occupation of a larger external space of the module.

Figure 3:
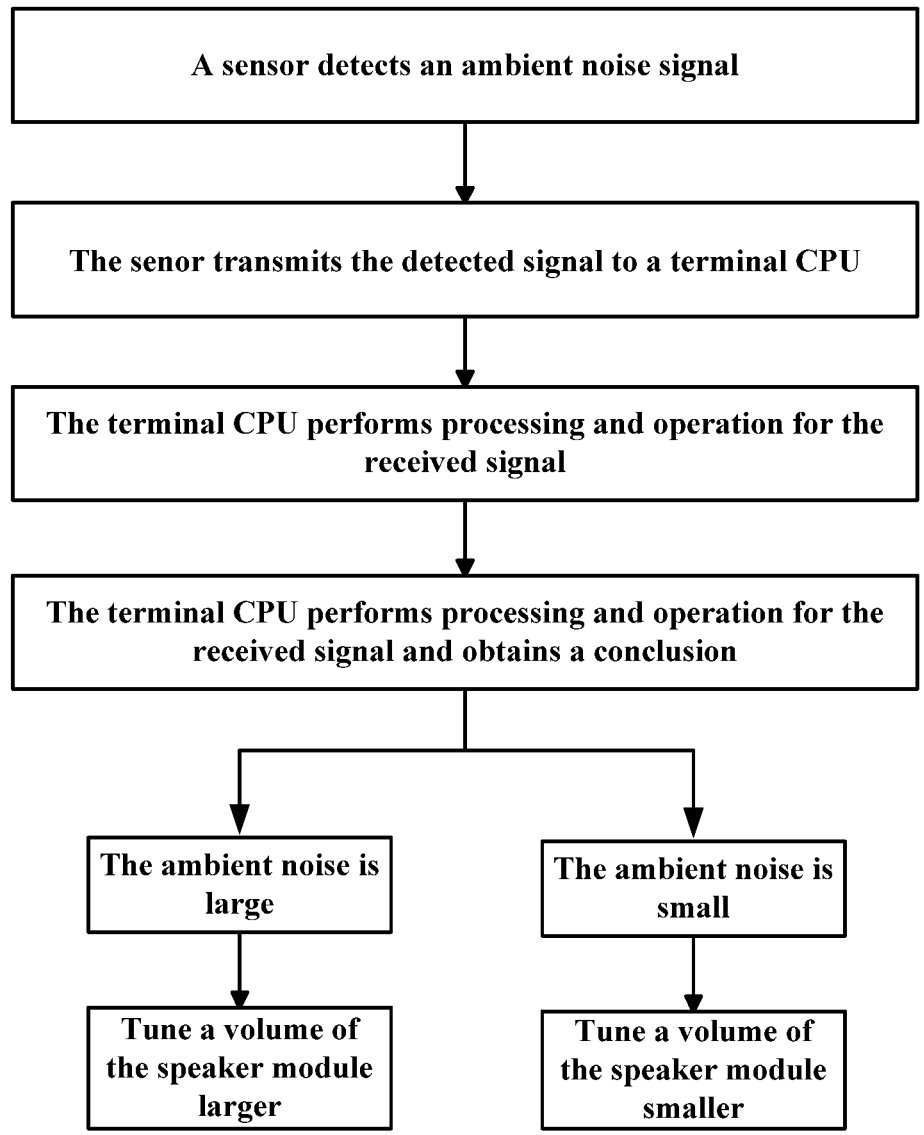
FIG. 3 is a flowchart of an operating principle of the speaker module according to the present disclosure.

As shown in FIG. 3, an operating principle of the present disclosure is as follows:

Noise outside the electronic terminal enters into the electronic terminal through the sound exit hole and is detected by the sensor, the sensor transmits the detected ambient noise signal to the CPU of the electronic terminal, the terminal CPU performs processing and operation for the received signal and judges the noisy degree of the ambient environment according to an operation result, thereby automatically tuning the volume of the sound generated by the speaker module. When the noisy degree of the ambient environment is high (namely, upon large noise), the CPU tunes the volume of the speaker module larger; if the noisy degree of the ambient environment is low (namely, upon low noise), the CPU tunes the volume of the speaker module smaller, thereby ensuring the mobile phone owner to timely hear a prompt tone generated by the electronic terminal in whatever environment, and effectively avoiding missing an important event or call due to failure to hear the prompt tone, and properly reducing power consumption of the terminal.

The naming of the first housing and second housing or the first housing, second housing and third housing involved in the embodiments is only intended to distinguish technical features and does not represent a positional relationship and an installation sequence between the two housings or among the three housings.

The description only presents detailed illustration of the inventive concept of the present disclosure by taking the speaker module shown in the figures as an example, and this does not mean the protection scope of the present disclosure is only limited to the speaker module of such structure. In fact, the technical solution in which a noise detecting sensor is added in the module and the sensor cooperates with the electronic terminal CPU to automatically control the sound volume may be applied to any type of speaker module. Hence, any speaker module product, no matter whether the speaker module is rectangular, circular or track-shaped or the like, and regardless of the structure of housings of the speaker module and the internal speaker unit, falls within the protection scope of the present disclosure so long as the noise detecting sensor is additionally provided to control the volume of the speaker module.

The present disclosure is not limited to the above specific embodiments, and diverse variations made by those having ordinary skill in the art starting from the above concept without making any inventive efforts all fall within the protection scope of the present disclosure.

What is claimed is:

1. A speaker module installed in an electronic terminal, the speaker module comprising:
   a housing receiving therein a speaker unit which is electrically connected with an external circuit of the module via a flexible printed circuit board (FPCB); and
   a sensor configured to detect ambient noise, the sensor electrically connected with the FPCB, the sensor installed at a position adjacent to a sound exit hole of the electronic terminal, and the sensor used to transmit a detected ambient noise signal to a CPU of the electronic terminal via the FPCB;
   wherein a probe of the sensor faces towards the sound exit hole; and
   wherein the housing comprises a first housing and a second housing engaged with the first housing, a notch is positioned on the second housing at a position corresponding to the FPCB, a lug mates with the notch and is positioned on the first housing at a position corresponding to the notch, and the FPCB runs between a bottom of the notch and an end of the lug.

2. The speaker module according to claim 1, wherein the sensor is installed at a location where the FPCB is located in a module inner cavity, an installation hole is provided on the second housing, and the probe of the sensor extends through the installation hole out of the module inner cavity.

3. The speaker module according to claim 1, wherein the sensor is installed outside the first housing.

4. The speaker module according to claim 1, wherein the sensor is installed outside the second housing.

* * * * *